United States Patent [19]
Christensen

[11] Patent Number: 5,904,463
[45] Date of Patent: May 18, 1999

[54] CARGO LOADING AND CARRYING DEVICE FOR USE ON A MOTOR VECHICLE ROOF

[76] Inventor: Robyn M. Christensen, Farmington, N.M.

[21] Appl. No.: 09/126,063

[22] Filed: Jul. 30, 1998

[51] Int. Cl.⁶ ........................................................ B60R 9/00
[52] U.S. Cl. ............................................. 414/462; 224/310
[58] Field of Search ................................. 414/462, 494, 414/529, 538, 679; 224/309, 310

[56] References Cited

U.S. PATENT DOCUMENTS

| | | | |
|---|---|---|---|
| D. 258,054 | 1/1981 | Ellis | D12/54 |
| D. 278,172 | 3/1985 | Ellis | D34/33 |
| 2,469,987 | 5/1949 | Pilsner | 414/462 |
| 2,849,135 | 8/1958 | Embler | 214/450 |
| 3,048,291 | 8/1962 | Mabry | 414/462 |
| 3,139,203 | 6/1964 | Borger | 214/450 |
| 3,215,294 | 11/1965 | Salamin | 214/450 |
| 3,215,295 | 11/1965 | Schuyler | 414/462 |
| 3,452,893 | 7/1969 | Heflin | 214/450 |
| 3,480,166 | 11/1969 | Abbott | 414/462 |
| 3,531,006 | 9/1970 | Farchmin | 214/450 |
| 3,608,759 | 9/1971 | Spurgeon | 214/450 |
| 3,826,390 | 7/1974 | Watson | 414/462 |
| 3,878,954 | 4/1975 | Jessee | 414/462 |
| 4,003,485 | 1/1977 | Edgerton | 214/450 |
| 4,062,464 | 12/1977 | Grove | 414/462 |
| 4,063,659 | 12/1977 | Welch | 224/310 |
| 4,087,029 | 5/1978 | Shoemaker | 224/310 |
| 4,139,110 | 2/1979 | Roberts | 214/450 |
| 4,272,218 | 6/1981 | Carter | 414/462 |
| 5,284,282 | 2/1994 | Mottino | 224/310 |
| 5,338,147 | 8/1994 | Kucharczyk et al. | 414/542 |
| 5,460,472 | 10/1995 | Bamber | 414/462 |

FOREIGN PATENT DOCUMENTS

| | | | |
|---|---|---|---|
| 784564 | 5/1968 | Canada | 224/310 |

Primary Examiner—Dean Kramer
Assistant Examiner—Douglas Hess
Attorney, Agent, or Firm—John D. Gugliotta

[57] ABSTRACT

A cargo loading and carrying device for use on a motor vehicle roof is disclosed, and according to the present invention, is designed to load cargo onto the roof of a motor vehicle from the rear of the vehicle. The present invention consists of a generally rectangular frame with side walls and two main rollers, all located on the roof of the motor vehicle. The main frame continues downward to the trunk of the motor vehicle, where telescoping legs elevate a third main roller up from the trunk of the motor vehicle. Two guide beams connect the third main roller and the main frame portion located on the roof, and act as guides and resting beams for the cargo as it is hoisted onto the roof via a crank and cable assembly. As a crank handle is turned, a cable wraps around the forward located main roller, hoisting up the cargo, which is connected to the opposite end of the cable. Cargo securement rings, located on the side walls of the main frame, are used in conjunction with traditional cargo securement means, such as adjustable straps.

14 Claims, 5 Drawing Sheets

CARGO LOADING AND CARRYING DEVICE FOR USE ON A MOTOR VECHICLE ROOF

BACKGROUND OF THE INVENTION

1. Field of the Invention

The present invention relates generally to lifting devices and, more particularly, to a cargo loading and carrying device for use on a motor vehicle roof.

2. Description of the Related Art

Many times in busy society, individuals desire to take large sized items with them as they travel in their motor vehicle. These items include canoes and other cargo. Individuals who own trucks can often place the items in the bed of the vehicle. For automobile owners, however, it is often necessary to place items on the roof of the motor vehicle in order to transport them safely, efficiently, and cost effectively.

There are several problems inherent in placing items on the roof of a motor vehicle. First, lifting the item onto the roof requires significant physical strength, not often possessed by the average individual, not to mention the elderly, young and infirm. Second, shorter individuals find it difficult to maneuver the item onto the roof. Third, the item may scratch the paint on the roof. Fourth, the item is difficult to secure in place on the roof. The resulting risk of injury to the motor vehicle, cargo and other cars on the road is raised when the cargo cannot be fastened securely to the roof. Fifth, dismounting the item from the roof is difficult. Sixth, the securement device used is often bolted to the roof, causing permanent damage to the roof and requiring that the device be permanently secured to the roof. This creates a continuous eyesore to many individuals who do not wish the securement device to be constantly on the roof. Seventh, removing the securement means is often a time consuming and difficult process. Eighth, the devices are often complicated, with many moving parts, each of which is subject to structural integrity failure with repeated use.

Devices in the previous art attempt to address these problems in various ways, as numerous attempts have been made to correct for the foregoing drawbacks to roof top cargo transport.

U.S. Pat. No. 5,460,472, issued in the name of Bamber, discloses a cartop hoist and carrier apparatus having a crane rotatably mounted to a frame that is adapted to be secured to the top of an automotive vehicle.

U.S. Pat. No. 5,338,147, issued in the name of Kucharczyk et al., discloses a hoist apparatus used for transferring goods into and from a cargo compartment of a trailer or the like, consisting of a vertical I-beam, rollers and cables.

U.S. Pat. No. 4,003,485, issued in the name of Edgerton, discloses a vehicle-top loader comprised of a carriage that rests on a vehicle-top rack and moves across the rack and pivots downward to a slant position alongside the vehicle to facilitate loading and unloading of cargo from the roof.

U.S. Pat. No. 3,608,759, issued in the name of Spurgeon, discloses a motor vehicle top carrier that loads cargo from the side using a wheel and pulley mechanism. Other devices that load cargo onto a motor vehicle roof from the side include U.S. Pat. No. 3,452,893, issued in the name of Heflin and U.S. Pat. No. 2,849,135, issued in the name of Embler.

Other devices utilizing cable hoisting mechanisms include U.S. Pat. No. 3,215,294, issued in the name of Salamin and U.S. Pat. No. 3,139,203, issued in the name of Borger. U.S. Pat. No. Des. D278,172, discloses an auto roof hoist bar to be used with a cargo hoisting system for an automobile roof.

Some devices are specifically designed to load and transport specific objects on the roof of a motor vehicle.

U.S. Pat. No. 5,284,282, issued in the name of Mottino, discloses a device for loading, unloading and carrying a bicycle in an upright position on a motor vehicle roof, comprised a shaped tube having its base pivotally connected to a support fastened to a carrier rial.

U.S. Pat. No. 4,272,218, issued in the name of Carter, discloses a wheelchair transportation device, comprised of supporting base mounted to the roof with an overlying frame rotatably mounted to the base above the driver's position. The frame is biased to rotate outwardly of the motor vehicle and a cable is used to raise the wheelchair.

U.S. Pat. No. 4,139,110, issued in the name of Roberts, discloses a boat loading and unloading device comprised of a moveable frame, mounted inside of a fixed frame on the top of a vehicle. Davit-like structures which connect to a rod having pulley and line means provide the hoisting means.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved loading and carrying device for use on a motor vehicle roof that simplifies the task of transporting cargo on a roof of a motor vehicle.

Briefly described according to one embodiment of the present invention, an improved loading and carrying device for use on a motor vehicle roof is disclosed, and is designed to load cargo onto the roof of a motor vehicle from the rear of the vehicle. The present invention consists of a generally rectangular main frame with side walls and two main rollers, all located on the roof of the motor vehicle. The main frame continues downward to the trunk of the motor vehicle, where telescoping legs elevate a third main roller up from the trunk of the motor vehicle. Two guide beams connect the third main roller and the main frame portion located on the roof, and act as guides and resting beams for the cargo as it is hoisted onto the roof via a crank and cable assembly. As a crank handle is turned, a cable wraps around the forward located main roller, hoisting up the cargo, which is connected to the opposite end of the cable. Cargo securement rings, located on the side walls of the main frame, are used in conjunction with tradition cargo securement means, such as adjustable straps.

It is another object of the present invention to provide a device that does not require significant physical strength of the operator.

It is another object of the present invention to provide a device that can be operated by one individual.

It is another object of the present invention to provide a device that allows easy maneuverability of the cargo onto and off of the roof.

It is another object of the present invention to provide a device that can be used by individuals of all heights.

It is another object of the present invention to provide a device that does not damage the roof while being installed or while being used with cargo. It is another object of the present invention to provide a device that securely holds the cargo on the roof.

It is another object of the present invention to provide a device that is portable, being lightweight so as to be capable of being quickly and easily removed from the roof without damage thereto.

It is another object of the present invention to provide a device that is simple in design, thereby reducing the number of mechanical parts subject to structural failure.

DESCRIPTIVE KEY 10 a cargo loading and carrying device for use on a motor vehicle roof
20 roof
30 motor vehicle
40 main frame
50 side wall
60 side wall hole
70 first main roller
80 second main roller
90 scratch preventative material
100 rotaton bar
110 roller bearings
120 main roller attachment means
130 crank handle
140 ratcheting mechanism
150 ratchet release lever
160 cable
170 spring loaded clasping means
180 cable attachment means
190 support leg
200 securement pad
210 main frame securement means
220 cargo securement ring
225 cargo securement means
230 rolling mechanism
240 guide post
250 guide beam
260 lower guide beam
270 upper guide beam
280 spring loaded ball bearing
290 adjustment hole
300 telescoping support leg
310 third main roller
320 extension assembly
330 extension beam
340 extension resting bar
350 extension leg
360 ground
365 roof rack
370 roof rack resting plate

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a cargo loading and carrying device for use on a motor vehicle roof 10.

The best mode for carrying out the invention is presented in terms of its preferred embodiment, herein depicted within the FIGS. 1, 2, 3 and 6.

1. Detailed Description of the Figures

Figure 1:
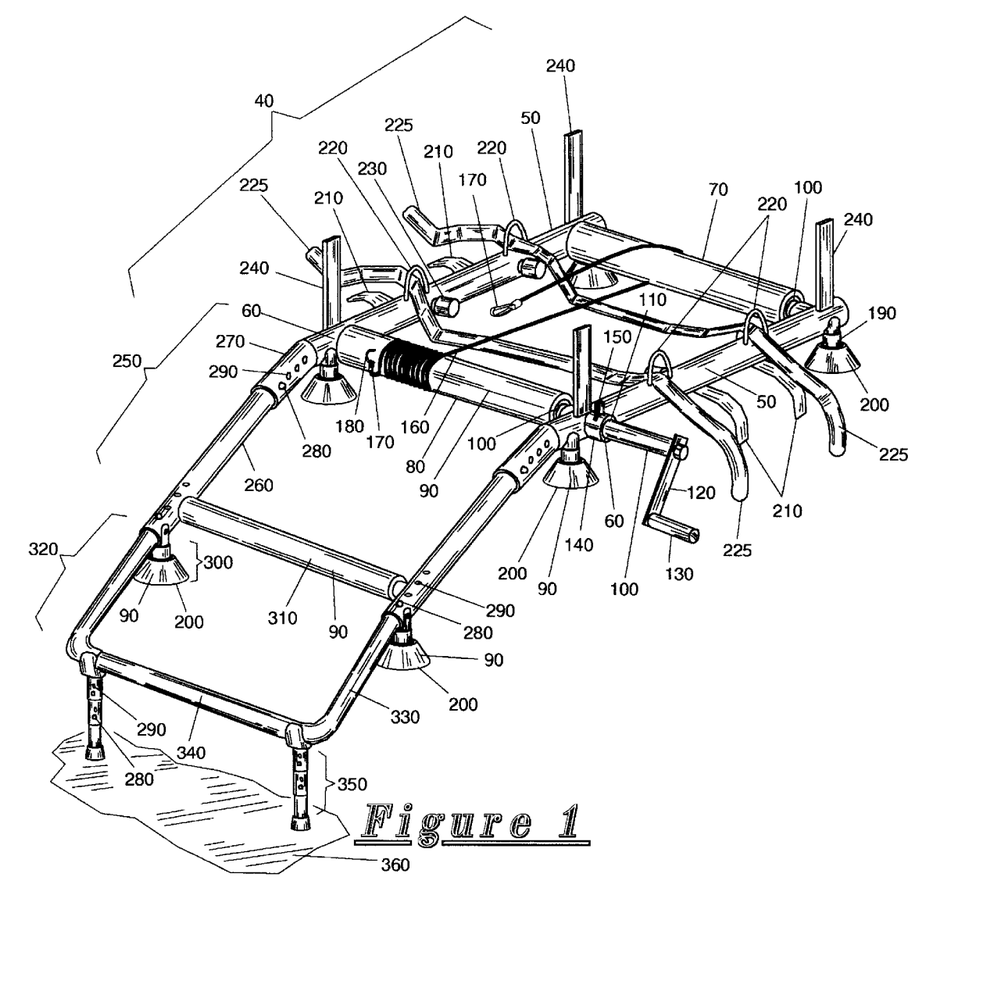
FIG. 1 is an elevational view of a preferred embodiment of a cargo loading and carrying device for use on a motor vehicle roof 10.

Referring now to FIG. 1, a cargo loading and carrying device for use on a motor vehicle roof 10 is shown, according to the present invention, is designed to load cargo onto the roof 20 of a motor vehicle 30 from the rear of the motor vehicle 30.

Figure 2:
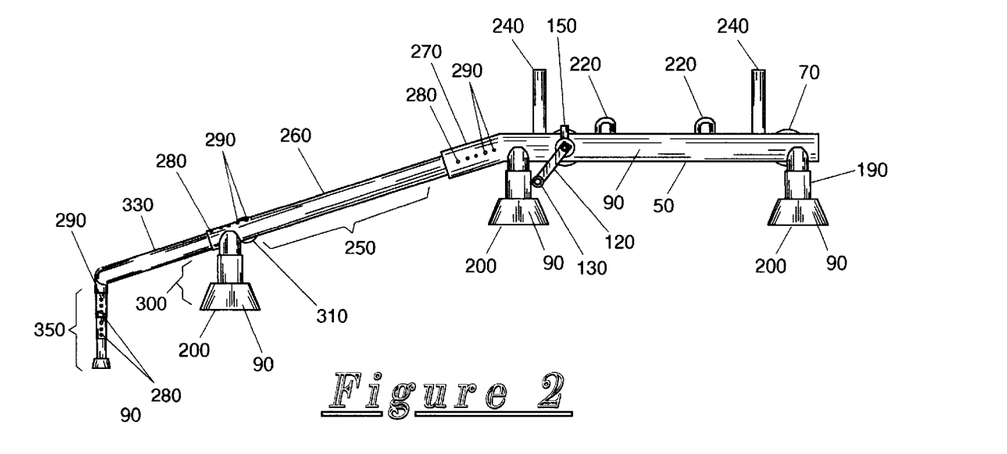
FIG. 2 is a top view thereof.

Referring now to FIGS. 1 & 2, the preferred embodiment of the present invention comprises a main frame 40 of a generally rectangular configuration. The main frame 40 has two side walls 50, of horizontally elongated, upstanding rectangular configuration, and is designed to be positioned on a roof 20 of a motor vehicle 30. Near each end of each side wall 50 is a side wall hole 60. Each side wall hole 60 has a horizontal radial centerline, and is located along the elongated centerline of the side wall 50, in the same position relative to the nearest end of the side wall 50.

A main roller is positioned on either end of the main frame 40. A first main roller 70 is located nearer the front of the motor vehicle 30. A second main roller 80 is located near the rear of the motor vehicle 30. The main rollers are parallel to each other and perpendicular to the elongated centerlines of the side walls 50, so as to form a main frame 40 of generally rectangular configuration.

Each main roller is of a generally linearly elongated, cylindrical, configuration. The exterior circumferential surface of each main roller is covered in a scratch preventative material 90, such as soft plastic or rubber.

Located at each end of the main roller is a rotation bar 100. The rotation bar 100 is of a linearly elongated, cylindrical configuration, with an identical radial centerline as the main roller. The rotation bars 100 are of sufficient length such that each slidably engages and passes through a corresponding side wall 50 hole. Roller bearings 110 are positioned between the rotation bar 100 and the side wall 50 holes so as to facilitate a smooth, controlled rotation of the main rollers.

Each main roller is rotatably secured to the side walls 50 using main roller attachment means 120, such as cotter pins or other means as are well known in the roller industry.

The cross sectional diameter of each main roller is greater than the cross sectional diameter of the side wall 50 holes, and is of sufficient size so that when the rotation bars 100 are inserted into their respective side wall 50 holes, the exterior circumferential surface of the main shaft rises above the vertical height of the side walls 50, so as to facilitate the rolling of a piece of cargo onto and across the main frame 40.

A crank handle 130, of a generally L-shaped configuration, is permanently affixed to one end of a rotation bar 100, opposite the second main roller 80, so as to permit rotation of the main roller by rotating the crank handle 130 in the vertical plane. The crank handle 130 pivots so as to rest against the exterior surface of the side wall 50.

A ratcheting mechanism 140 is located at the connection point of the crank handle 130 and the rotation bar 100. A ratchet release lever 150 disengages the ratcheting mechanism 140.

A cable 160 is used to hoist cargo onto the main frame 40. The cable 160 is constructed of a strong, lightweight material, such as nylon, and is of sufficient length so as to wrap around the first main roller 70 and extend down from the roof 20 of a motor vehicle 30 and releasable secure to a piece of cargo.

Attached to both ends of the cable 160 is a spring loaded clasping means 170, of the oval type configuration typically used by mountain climbers.

Located near the lateral center point of the second main roller 80 is a cable attachment means 180. The cable attachment means 180 is of a generally semicircular, arc shaped configuration, extending outward from the exterior surface of the main roller, and is designed to permit the spring loaded clamping means to releasable attach thereto.

Located at each end of each side wall 50, and extending downward, perpendicular to the horizontal plane formed by the elongated centerline of the side wall 50, is a support leg 190. Each support leg 190 is of a generally linearly elongated, cylindrical configuration, with the cross sectional diameter increasing as the support leg 190 extends outward from the main frame 40.

Securement pads 200 are positioned on the end of each support leg 190, opposite the side wall 50, and are designed to rest against the top surface of a motor vehicle 30 roof 20 without damaging the paint on the roof 20. Each securement pad 200 is of a generally cylindrical configuration, and is constructed of a scratch preventative material 90, such as soft plastic or rubber.

A set of main frame securement means 210, such as adjustable straps, are connected to the exterior surface of each side wall 50, and are designed to connect with their respective mating portion inside of the motor vehicle 30. As such, the present invention is secured to the roof 20 of a motor vehicle 30.

A plurality of cargo securement rings 220 is located along the top surface of each side wall 50. The cargo securement rings 220 are located in the same location on each side wall 50, such that pairs exist to secure cargo. Each cargo securement ring 220 is of a generally semicircular, arc shaped, vertically extended configuration, designed to be used to be used in conjunction with traditional cargo securement means 225, such as adjustable straps or rope.

A plurality of rolling mechanisms 230 is connected to the interior surface of the side walls 50. The rolling mechanisms 230 are equally spaced, and positioned to rotate in a vertical plane that is parallel to the elongated centerline of the side walls 50 of the main frame 40, so as to facilitate the rolling movement of a piece of cargo onto and along the main frame 40. Each rolling mechanism 230 is positioned sufficiently high on the interior surface of the side walls 50 of the main frame 40 to allow cargo to roll slightly above the top surface of the anterior wall and side walls 50.

Located at each end of the side walls 50, and extending upward, perpendicular to the horizontal plane formed by the elongated centerline of the side walls 50, is a guide post 240, of a linearly elongated, cylindrical configuration. Each guide post 240 is of sufficient length so as to guide a piece of cargo onto the main frame 40 during loading and to secure the cargo from horizontal movement during transport.

Figure 3:
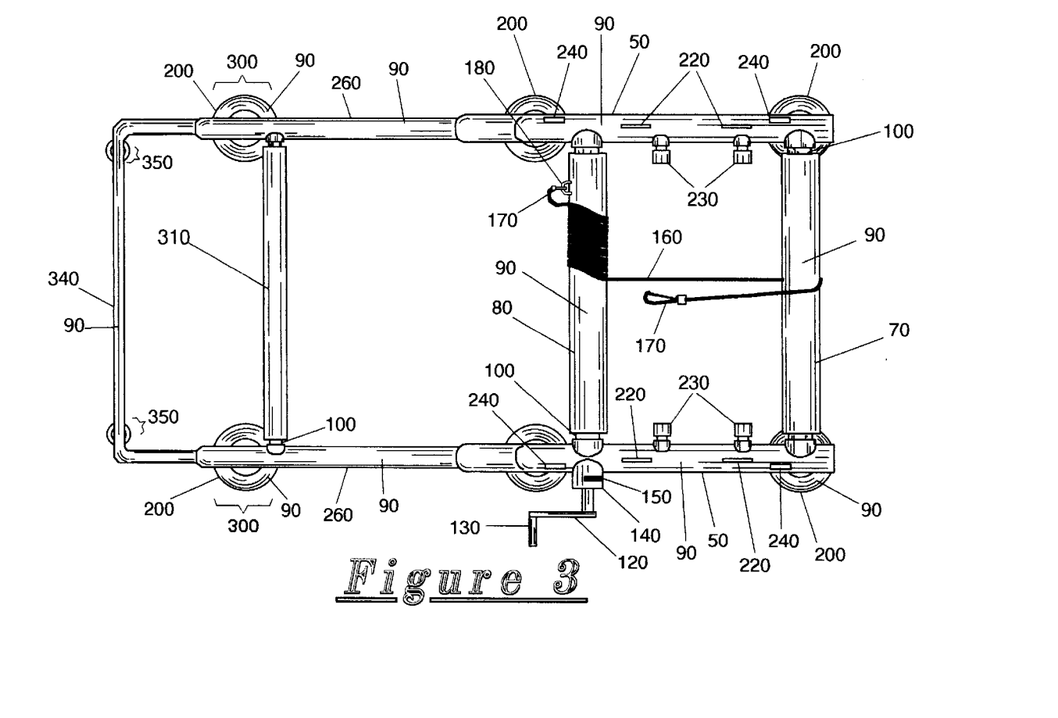
FIG. 3 is a right side view thereof, with the left side view being a mirror image of the right side view.

Referring now to FIGS. 1, 2 & 3, extending outward and downward from the ends of the side walls 50 that are located near the rear of the motor vehicle 30, are a set of parallel guide beams 250, of a linearly elongated, rectangular configuration. Each guide beam 250 is of a two-piece construction, with the lower guide beam 260 slidably inserting into an upper guide beam 270. Adjustment of the depth of penetration of the lower guide beam 260 into the upper guide beam 270 is made using means known in the industry, such as a spring loaded ball bearing 280 and vertically aligned adjustment holes 290 that are positioned in the top surface of the upper guide beam 270.

The ends of each lower guide beam 260 connect to a telescoping support leg 300, of a generally cylindrical configuration, designed to be positioned on the trunk of a motor vehicle 30.

Telescopic adjustment is made using means known in the industry, such as a spring loaded ball bearing 280 and vertically aligned adjustment holes 290 in the upper portion of a plurality of telescoping, cylindrical housings. The purpose of the telescoping support legs 300 is to elevate the rear portion of the present invention up from the trunk of the motor vehicle 30 so as to not cause mechanical interference between the cargo and the trunk of the motor vehicle 30 during loading and unloading.

Securement pads 200 are positioned on the end of each telescoping support leg 300, opposite the guide beam, and are designed to rest against the top surface of a motor vehicle 30 trunk without damaging the paint on the trunk. Each securement pad 200 is of a generally cylindrical configuration and is constructed of a scratch preventative material 90, such as soft plastic or rubber.

Located between the two telescoping support legs 190 is a third main roller 310, of the identical configuration and functionality as described in detail above.

It is envisioned that other styles and configurations of the main frame 40 can be easily incorporated into the teachings of the present invention, and only one particular configuration shall be shown and described for purposes of clarity and disclosure and not by way of limitation of scope.

It is envisioned that the all major components of the present invention be constructed of a strong, lightweight material, such as aluminum.

Figure 4:
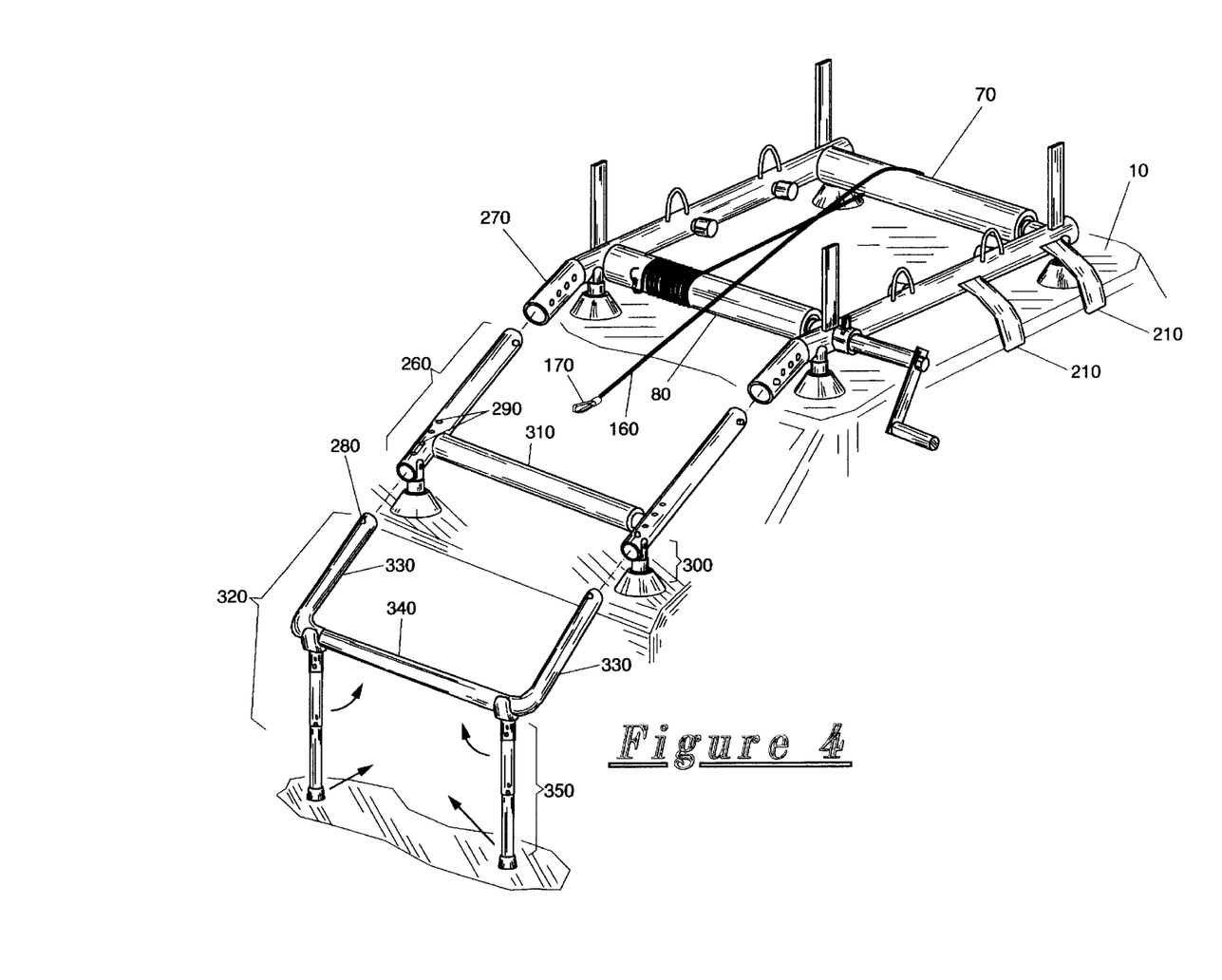
FIG. 4 is an elevational view of an alternate embodiment of the present invention.

Referring now to FIG. 4, in an alternate embodiment of the present invention, an extension assembly 320 is retractable connected to the ends of the guide beams, opposite the second main roller 80. The extension assembly 320 is comprised of two extension beams 330, capable of being retracted into the ends of the lower guide beams 260. Depth of penetration into each lower guide beam 260 is adjustable via means known in the industry, such as a spring loaded ball bearing 280 and vertically aligned adjustment holes 290 in the upper surfaces of the lower guide beams 260. An extension resting bar 340 connects the two ends of the extension beams 330. An extension leg 350 is pivotable connected to each end of the extension resting bar 340, pivoting upward and resting on the lower surface of the extension resting bar 340, so as to not interfere with the movement of the extension beams 330 into their respective lower guide beams 260. Each extension leg 350 is designed to rest against the ground 360 when in the extended position.

Figure 5:
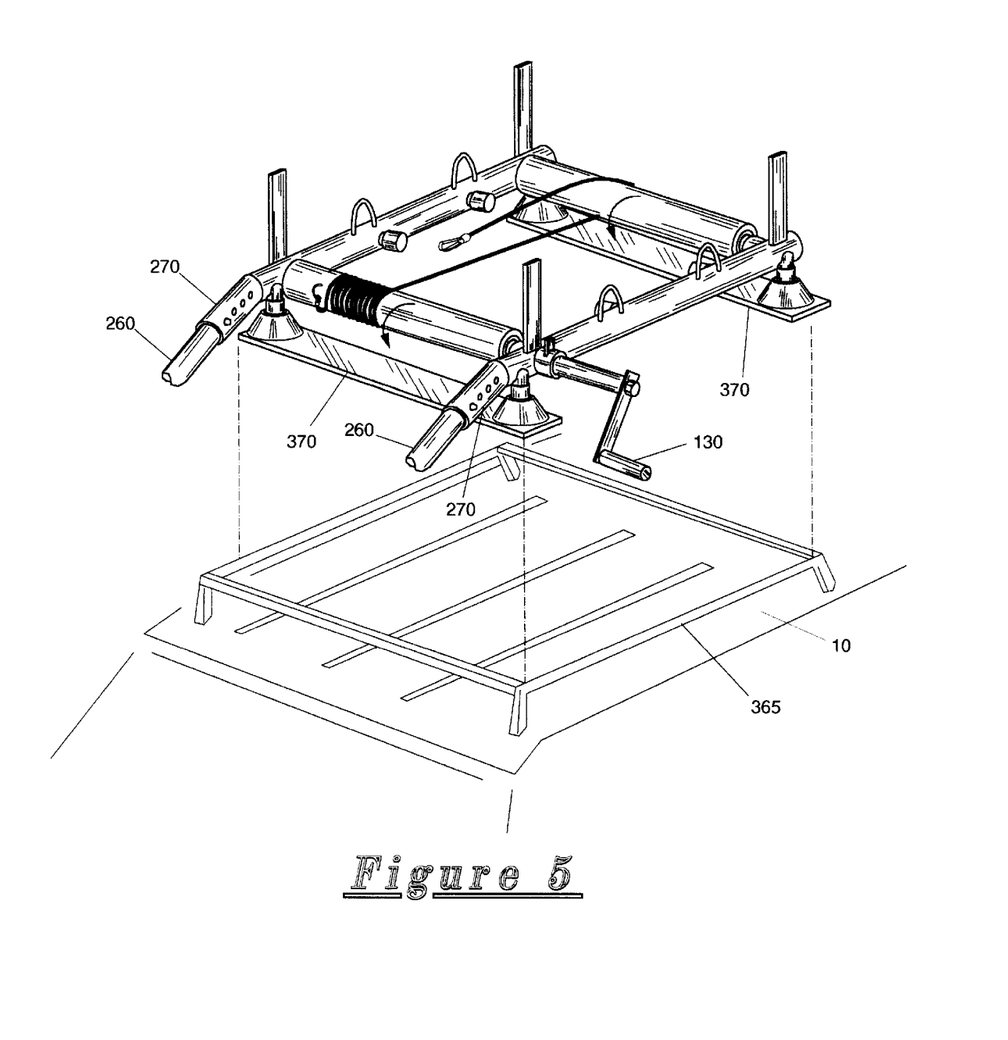
FIG. 5 is an elevational view of another preferred embodiment of the present invention designed to be used with a roof rack.

Referring now to FIG. 5, it is envisioned that in another alternate embodiment of the present invention, the present invention can be used with a roof rack 365 on a motor vehicle 30. A set of roof rack resting plates 370, of horizontally elongated, rectangular construction, are connected to the ends of the support legs 190, opposite the side walls 50, such that the roof rack resting plates 370 are positioned parallel to and beneath the first main roller 70 and second main roller 80, respectively, and resting flat against a roof rack 365.

2. Operation of the Preferred Embodiment

Figure 6:
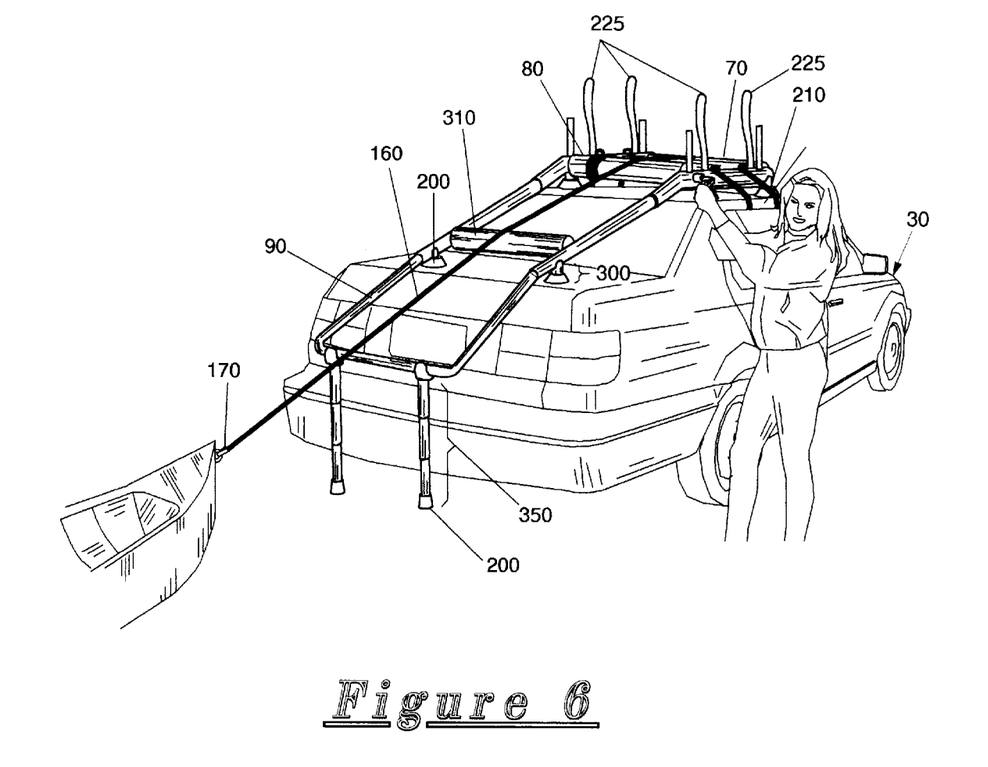
FIG. 6 is a perspective, in use view of the preferred embodiment of the present invention.

Referring now to FIG. 6, to use the present invention to load cargo, the operator should: first, hoist the main frame 40 onto the roof 20 of a motor vehicle 30; second, tighten the main frame 40 securement straps inside of the motor vehicle 30; third, unfold the crank handle 130; fourth, unravel the cable 160 from the second main roller 80 and wrap the cable 160 under and around the first main roller 70; fifth, in the alternate embodiment, deploy the extension assembly 320 and lock into place; sixth, connect the cable 160 to the cargo; seventh, align the cargo at the rear of the motor vehicle 30; eighth, begin to crank, using the ratcheting mechanism 140; ninth, when the cargo is situated on the main frame 40, secure the cargo via the cargo securement means 225; tenth, fold the crank handle 130 in; eleventh, push in the telescoping support legs 300; twelfth, if using the alternate embodiment, retract the extension assembly 320; thirteenth, drive away.

To unload cargo, the operator should: first, unfold the crank handle 130; second, release the cargo securement means 225; third, disengage the ratcheting mechanism 140 via the ratchet release lever 150; fourth, pull out the telescoping support leg 300; fifth, if using the alternate embodiment, extend the extension assembly 320; sixth, lower the cargo off the back of the motor vehicle 30 using the crank handle 130; seventh, remove the cargo completely from the motor vehicle 30; eighth, disengage the cable 160 from the cargo; ninth, retract the cable 160 onto the second main roller 80; tenth, retract the telescoping support legs 300 and the extension assembly 320 (if using the alternate embodiment with the extension assembly 320); eleventh, release the main frame securement means 210 and remove the main frame 40 if so desired.

The foregoing description is included to illustrate the operation of the preferred embodiment and is not meant to limit the scope of the invention. The scope of the invention is to be limited only by the following claims.

What is claimed is:

1. A cargo loading and carrying device for use on a motor vehicle roof, said cargo loading device being designed to load cargo onto a roof of a motor vehicle from the rear of said motor vehicle, with a main frame, of a generally rectangular configuration, said main frame further comprising:

two side walls, of horizontally elongated, upstanding rectangular configuration, designed to be positioned on a roof of a motor vehicle;

side wall holes, located near each end of each side wall, with each said side wall hole having a horizontal radial centerline, and each hole located along the horizontal centerline of said side wall, in the same position relative to the nearest end of each of said side walls;

a first main roller is for locating nearer the front of said motor vehicle;

a second main roller is for locating near said rear of said motor vehicle;

scratch preventative material, located on the exterior surface of all components which come in contact with either cargo or said motor vehicle;

rotation bars, located at each end of said main roller, and used to connect each main roller to said main frame side walls;

roller bearings, positioned between said rotation bars and said side wall holes so as to facilitate a smooth, controlled rotation of said main rollers;

a crank handle, used to maneuver said cargo onto said main frame;

a ratcheting mechanism, located near a point where said crank handle meets said rotation bar;

a ratchet release lever, said ratchet release lever designed to disengage said ratcheting mechanism;

a cable, of nylon construction, used to hoist cargo onto said main frame;

spring loaded clasping means, attached to each end of said cable;

cable attachment means, used to connect said cable to said second main roller;

support legs, connected to said side walls, and used to support said main frame on top of a roof of a motor vehicle;

securement pads, positioned on the end of each support leg, and designed to rest against the top surface of a motor vehicle roof without damaging the paint on said roof;

a set of main frame securement means, connected to an exterior surface of each side wall;

a plurality of cargo securement rings, located along a top surface of each side wall, and used to secure cargo to said main frame;

a plurality of rolling mechanisms, each connected to an interior surface of said side walls, equally spaced, and positioned to rotate in a vertical plane that is parallel to the elongated centerline of said side walls of said main frame, so as to facilitate the rolling movement of a piece of cargo onto and along said main frame;

a plurality of guide posts, connected to and extending upward from each corner of said main frame, and designed to guide a piece of cargo onto said main frame during loading and to secure said cargo from horizontal movement during transport.

2. The cargo loading device of claim 1, wherein said cargo loading device further comprises:

a set of guide beams, extending outward and downward from said side walls, said guide beams located near the rear of said motor vehicle, used to support said cargo as it is hoisted onto said main frame;

a set of telescoping support legs, connected to ends of said guide beams, and designed to be positioned on the trunk of a motor vehicle; and a third main roller, located between said two telescoping support legs, and designed to facilitate ease of loading without damaging the trunk of a motor vehicle.

3. The cargo loading device of claim 2, wherein said first main roller, second main roller, and third main roller have radial center lines that are parallel to each other.

4. The cargo loading device of claim 2, wherein the purpose of said telescoping support legs is to elevate the rear portion of the present invention up from said trunk of said motor vehicle so as not to cause mechanical interference between said cargo and said trunk of said motor vehicle during loading and unloading.

5. The cargo loading device of claim 2, wherein said guide beams are of a linearly elongated, rectangular, two-piece configuration, with each guide beam further comprising:

an upper guide beam;

a lower guide beam, slidably inserting into said upper guide beam;

a spring loaded ball bearing used to adjust the depth of penetration of said lower guide beam into said upper guide beam; and adjustment holes, vertically aligned and positioned in a top surface of said upper guide beam, said adjustment holes used with said spring loaded ball bearing to adjust an overall length of each guide beam.

6. The cargo loading device described in claim 5, wherein an extension assembly is retractably connected to the ends of said guide beams, opposite said second main roller, said extension assembly further comprising:

two extension beams, having two ends, said extension beams capable of being slidably insertable into the ends of said lower guide beams;

spring loaded ball bearings, said spring loaded ball bearings designed to control depth of penetration of said extension beams into said lower guide beam;

adjustment holes, said adjustment holes located in upper surfaces of said lower guide beams, and used in conjunction with said spring loaded ball bearings to control depth of penetration of said extension beams into said lower guide beam;

an extension resting bar, said extension bar connecting the two ends of said extension beams; and a set of extension legs, pivotably connected to each end of said extension resting bar, pivoting upward and resting on a lower surface of said extension resting bar, so as to not interfere with the movement of said extension beams into their respective lower guide beams;

each said extension leg being designed to rest against the ground when in an extended position.

7. A method for loading cargo using said cargo loading device of claim 6, comprising the steps of:

hoisting said main frame onto said roof of a motor vehicle;

tightening said main frame securement straps inside of said motor vehicle;

unfolding said crank handle;

unraveling said cable from said second main roller and wrapping said cable under and around said first main roller;

in the alternate embodiment, deploying said extension assembly and locking into place;

connecting said cable to said cargo;

aligning said cargo at said rear of said motor vehicle;

rotating said crank, using said ratcheting mechanism;

when said cargo is situated on said main frame, securing said cargo via said cargo securement means;

folding said crank handle in;

pushing in said telescoping support legs; and in the alternate embodiment, retracting said extension assembly.

8. A method for unloading cargo using said cargo loading device of claim 6, comprising the steps of:

unfolding said crank handle;

releasing said cargo securement means;

disengaging said ratcheting mechanism via said ratchet release lever;

pulling out said telescoping support leg;

in the alternate embodiment, extending said extension assembly;

lowering said cargo off said rear of said motor vehicle using said crank handle;

removing said cargo completely from said motor vehicle;

disengaging said cable from said cargo;

retracting said cable onto said second main roller;

retracting said telescoping support legs; and in the alternate embodiment, retracting said extension assembly.

9. The cargo loading device of claim 1, wherein said crank handle is of a generally L-shaped configuration, being permanently affixed to one end of one said rotation bars, opposite said second main roller, so as to permit rotation of said main roller by rotating said crank handle, said crank handle being capable of pivoting so as to rest against said side wall.

10. The cargo loading device of claim 1, wherein said cable is constructed of a strong, lightweight material, such as nylon, and is of sufficient length so as to wrap around said first main roller and extend down from said roof of a motor vehicle and releasably secure to a piece of cargo.

11. The cargo loading device of claim 1, wherein said cable attachment means is of a generally semicircular, arc shaped configuration, extending outward from said second main roller, said cable attachment means designed to permit said spring loaded clasping means to releasably attach thereto.

12. The cargo loading device described in claim 1, wherein said side walls, said first main roller, said second main roller, said rotation bars, said crank handle, said support legs, and said guide posts are constructed of a strong, lightweight material.

13. The cargo loading device described in claim 1, wherein said cargo loading device is designed to load cargo onto said roof of a motor vehicle from said rear of said motor vehicle.

14. The cargo loading device described in claim 1, wherein said cargo loading device can be used with a roof rack on a motor vehicle, said cargo loading device further comprising:

a set of roof rack resting plates, of horizontally elongated, rectangular construction, said roof rack resting plates being connected to the ends of said support legs, opposite said side walls, such that said roof rack resting plates are positioned parallel to and beneath said first and second main rollers, respectively, and resting flat against said roof rack.

* * * * *